(12) United States Patent
Miller et al.

(10) Patent No.: US 8,901,428 B2
(45) Date of Patent: Dec. 2, 2014

(54) MOVABLY ADJUSTABLE COVER FOR CONDUCTORS AND INSULATORS

(71) Applicant: Preformed Line Products, Mayfield Village, OH (US)

(72) Inventors: Keith Miller, Twinsburg, OH (US); Mark Stransky, Munroe Falls, OH (US); Mark Burns, Macedonia, OH (US); Robert Peterson, Chardon, OH (US); Randy Cloud, Mentor, OH (US); Thomas Martin Haic, Concord, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 126 days.

(21) Appl. No.: 13/843,159

(22) Filed: Mar. 15, 2013

(65) Prior Publication Data

US 2014/0262485 A1  Sep. 18, 2014

(51) Int. Cl.
*H01R 4/70* (2006.01)
*H01B 17/56* (2006.01)
(52) U.S. Cl.
CPC ..................................... *H01B 17/56* (2013.01)

USPC ................... 174/138 F; 174/138 G; 174/40 R; 174/137 R; 174/178; 361/626; 248/49; 52/101

(58) Field of Classification Search
USPC ........................ 361/626; 248/49, 74.4; 52/101
See application file for complete search history.

(56) References Cited

U.S. PATENT DOCUMENTS

| 5,446,242 | A | * | 8/1995 | Barrett | 174/140 R |
| 6,730,852 | B1 | * | 5/2004 | Puigcerver et al. | 174/138 F |
| 7,884,285 | B2 | * | 2/2011 | Spencer | 174/138 F |

* cited by examiner

*Primary Examiner* — Dhirubhai R Patel
(74) *Attorney, Agent, or Firm* — Cooper Legal Group, LLC

(57) ABSTRACT

A cover apparatus is provided for covering an electrical insulator and a conductor. The cover apparatus includes a first cover portion extending along a first axis. The first cover portion includes a first segment covering a first portion of the electrical insulator and a second segment coupled to the first segment and covering a first portion of the conductor. The cover apparatus includes a second cover portion extending along a second axis. The second cover portion includes a third segment movably attached to the first segment and a fourth segment coupled to the third segment and covering a portion of the conductor. An example method of forming a cover apparatus for covering an electrical insulator and a conductor is also provided.

20 Claims, 8 Drawing Sheets

US 8,901,428 B2

MOVABLY ADJUSTABLE COVER FOR CONDUCTORS AND INSULATORS

TECHNICAL FIELD

The instant application is generally directed towards a cover apparatus. For example, the instant application is directed towards a cover apparatus for covering an electrical insulator and a conductor.

BACKGROUND

Wildlife, including avian wildlife (e.g., birds, raptors, eagles, etc.) can perch or otherwise come into contact with electrical insulators and energized conductors, which can, among other things, compromise reliability and stability of a service offered by a utility and/or harm the wildlife.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a cover apparatus is provided for covering an electrical insulator and a conductor. The cover apparatus comprises a first cover portion extending along a first axis. The first cover portion comprises a first segment configured to cover a first portion of the electrical insulator. The first cover portion comprises a second segment coupled to the first segment and configured to cover a first portion of the conductor. A second cover portion extends along a second axis. The second cover portion comprises a third segment movably attached to the first segment. The second cover portion comprises a fourth segment coupled to the third segment and configured to cover a portion of the conductor.

In an example, a cover apparatus is provided for covering an electrical insulator and a conductor. The cover apparatus comprises a first cover portion extending along a first axis. The first cover portion comprises a first segment configured to cover a first portion of the electrical insulator and a second segment coupled to the first segment and configured to cover a first portion of the conductor. The cover apparatus comprises a second cover portion extending along a second axis. The second cover portion comprises a third segment movably attached to the first segment and configured to cover a second portion of the electrical insulator. The second cover portion comprises a fourth segment coupled to the third segment and configured to cover a second portion of the conductor. A restraining structure is attached to one of the first cover portion or the second cover portion. The restraining structure is configured to limit movement between the third segment and the first segment.

In an example, a method of forming a cover apparatus for covering an electrical insulator and conductor is provided. The method comprises providing a first cover portion extending along a first axis. The method comprises attaching a second cover portion to the first cover portion. The second cover portion extends along a second axis and being movable with respect to the first cover portion.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
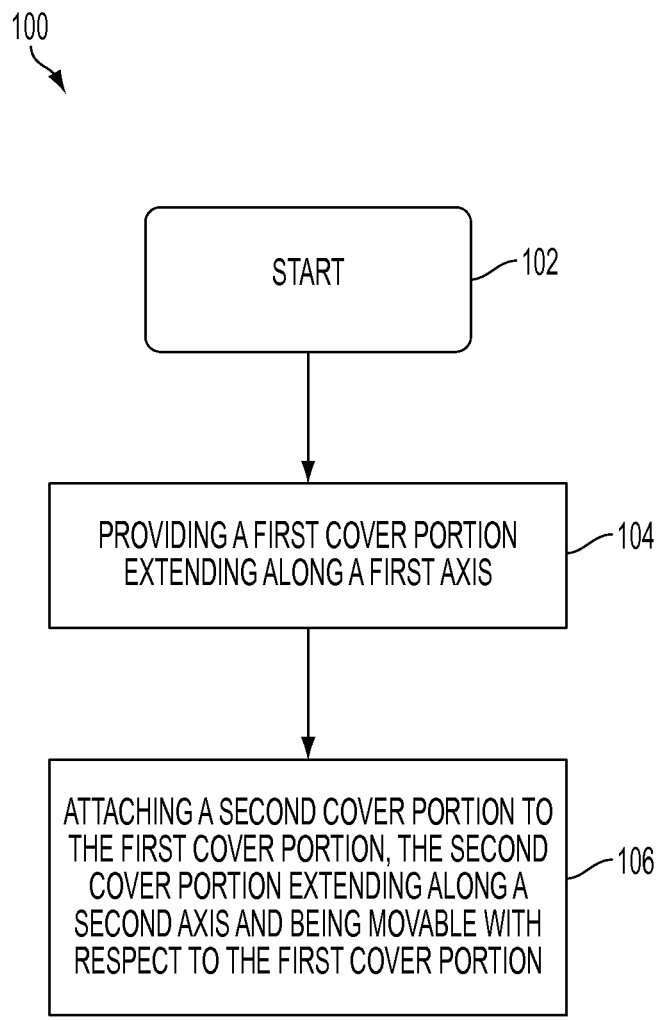
FIG. 1 is a flow diagram illustrating an example method of forming a cover apparatus for covering an electrical insulator and conductor.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Turning to FIG. 1, an example method 100 of forming a cover apparatus is illustrated. The method 100 can be used in association with some or all of the features illustrated in FIGS. 2 to 8. At 102, the method 100 starts. At 104, a first cover portion can be provided to extend along a first axis. At 106, a second cover portion can be attached to the first cover portion. The second cover portion can be movable with respect to the first cover portion. In an example, the second cover portion can extend along a second axis. The first axis and the second axis can be generally coaxial with each other when the first cover portion and second cover portion are moved to a first orientation. In a second orientation, the first axis and the second axis may be non-coaxial with each other.

Figure 2:
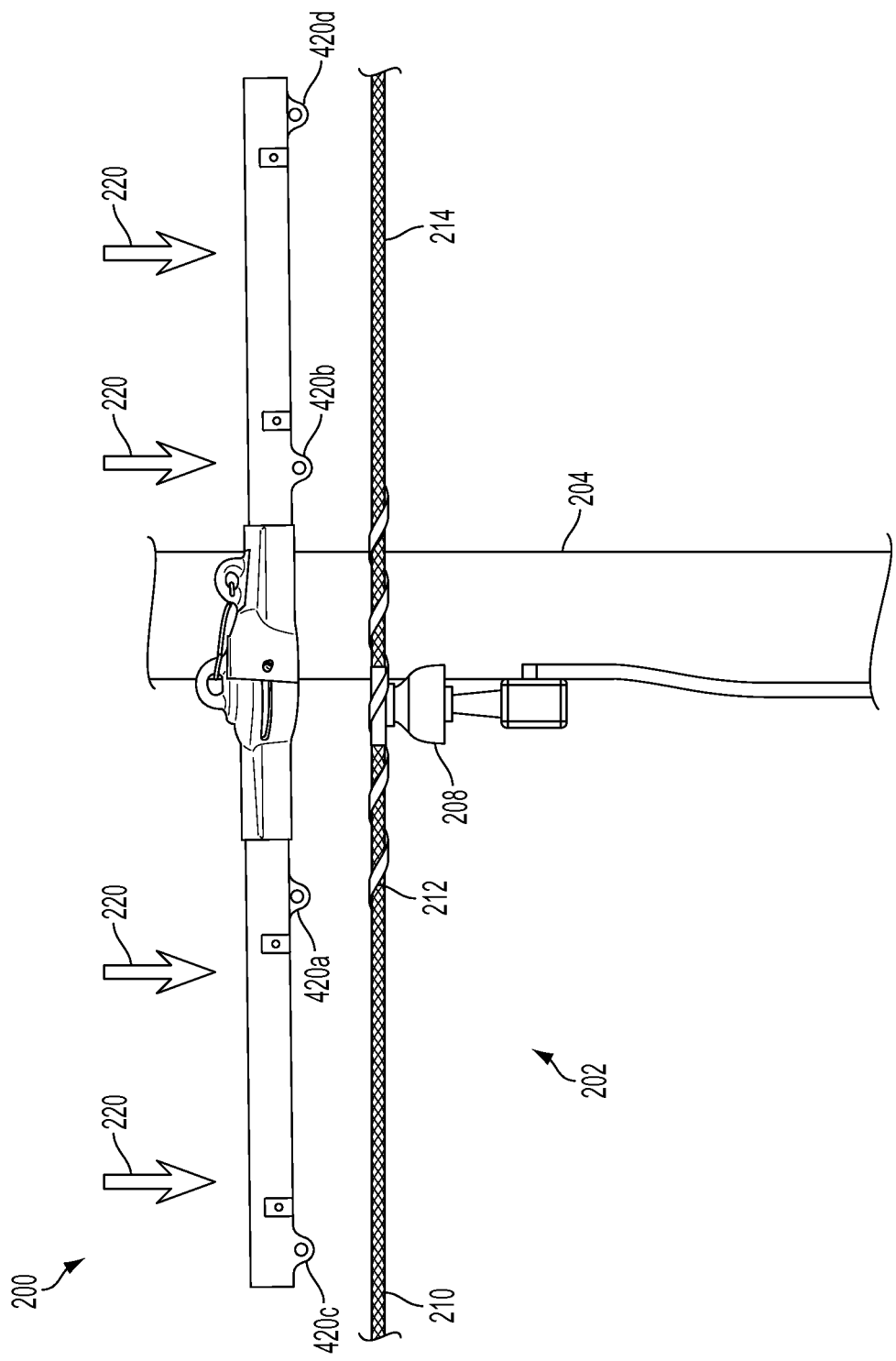
FIG. 2 is an illustration of an example cover apparatus in a removed/detached state from an electrical structure.

Turning now to FIG. 2, a cover apparatus 200 is illustrated for covering an electrical structure 202. The cover apparatus 200 is illustrated in a partially detached state from the electrical structure 202 so as to more clearly illustrate the features of the cover apparatus 200 and the electrical structure 202. In general, the cover apparatus 200 can cover the electrical structure 202 to provide at least some degree of protection to birds, raptors, eagles and/or other wildlife. For example, the cover apparatus 200 can comprise a non-conductive material, such as plastics, composites, etc.

The electrical structure 202 is somewhat generically/schematically illustrated, as the electrical structure 202 includes any number of sizes, shapes, structures, and configurations. In an example, the electrical structure 202 includes a utility pole 204. The utility pole 204 can support power lines, cables, fiber optic cables, transformers, street lights, or any other type of equipment. The utility pole 204 can include materials such as wood, metal, concrete, composites (e.g., fiberglass, etc.) or the like.

The utility pole 204 can support an electrical insulator 208. The electrical insulator 208 can withstand operating voltage and electrical surges. The electrical insulator 208 can include any number of materials. In an example, the electrical insulator 208 includes porcelain, though other materials are envisioned, including ceramic, glass, polymers, or the like. While the utility pole 204 is illustrated to support one electrical insulator 208 in this example, the utility pole 204 could likewise support multiple electrical insulators 208 in other examples.

The electrical insulator 208 can support at least one conductor 210. The conductor 210 can allow for current to flow through the conductor 210 so as to supply electricity. The conductor 210 can include wires, cables, electrical lines, or nearly any type of structure capable of allowing for current to flow therethrough. The conductor 210 is not limited to the illustrated dimensions, and could have a larger or smaller cross-sectional thickness than as illustrated. Likewise, the conductor 210 can extend a longer distance than as illustrated, as only a portion of the conductor 210 is illustrated.

In an example, the conductor 210 includes a first portion 212 and a second portion 214. The first portion 212 of the conductor 210 can be disposed on one side of the electrical insulator 208 while the second portion 214 of the conductor 210 can be disposed on an opposing second side of the electrical insulator 208. The first portion 212 and second portion 214 can extend a longer or shorter distance than as illustrated. As will be described in more detail below, the first portion 212 and second portion 214 can extend generally coaxially with each other along a linear axis. In other examples, however, the first portion 212 and second portion 214 can extend along axes that are non-coaxial with each other.

As illustrated by the directional arrows 220, the cover apparatus 200 can be applied to the electrical structure 202 so as to cover the electrical insulator 208 and the conductor 210. In an example, the directional arrows 220 are illustrated as being oriented in a downward direction, such as substantially perpendicular to a surface of a material(s) into which the utility pole 204 is inserted, mounted, etc. (e.g., pavement, concrete, earth, etc.). In an example, however, the cover apparatus 200 is not limited to being moved along the directional arrows 220 in the downward direction. Rather, the cover apparatus 200 can be applied to the electrical structure 202 from an angle relative to the surface of the material.

Figure 3:
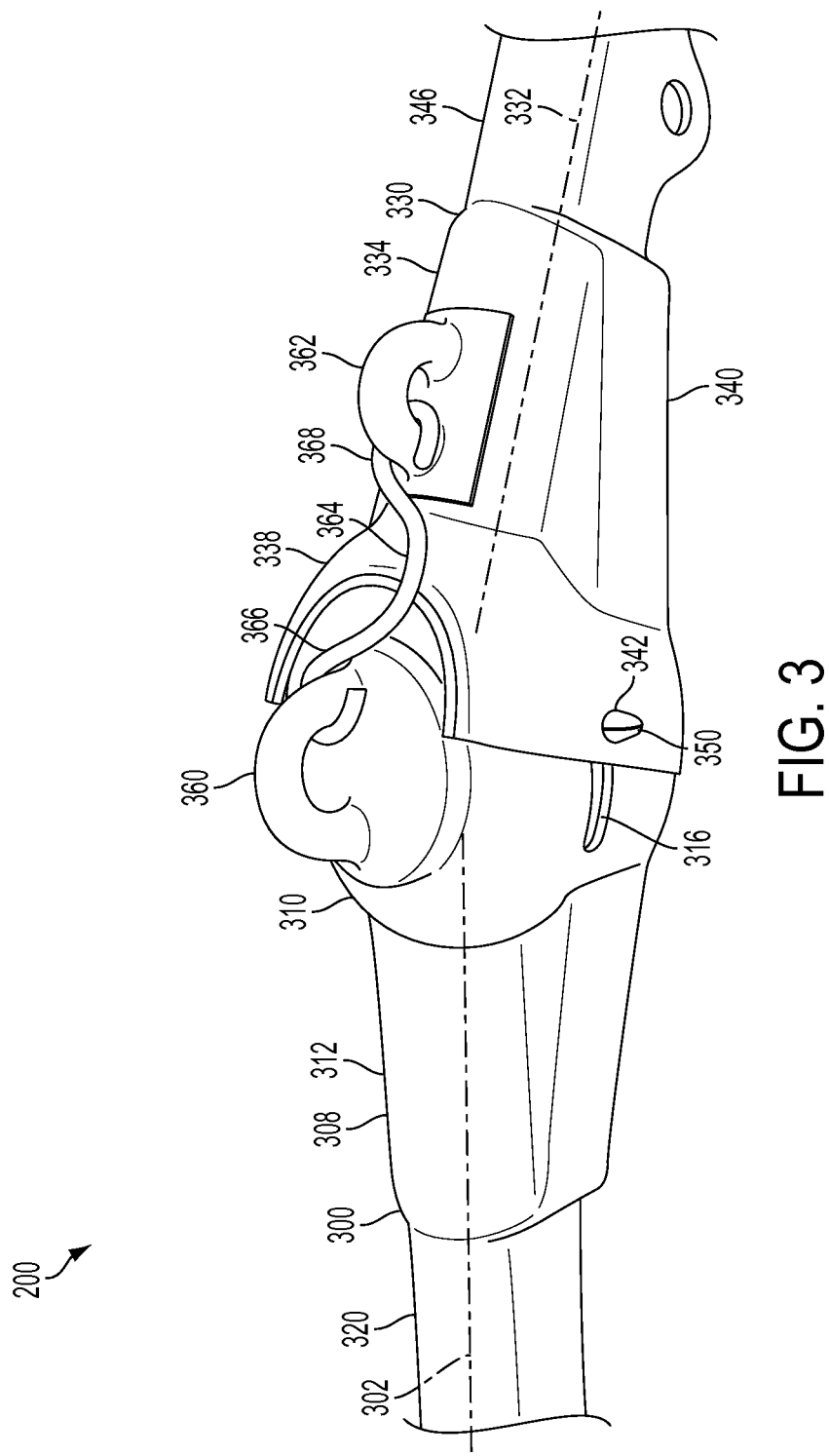
FIG. 3 is an illustration of an example cover apparatus extending along a non-linear axis.

Turning now to FIG. 3, the cover apparatus 200 is illustrated in more detail. While only a portion of the cover apparatus 200 (e.g., a center portion) is illustrated in this example for ease of illustration, the cover apparatus 200 can be longer in length than as illustrated, such as by having a length similar to that illustrated in FIG. 2. In an example, the cover apparatus 200 can include a length of approximately 2 meters (~80 inches). In other examples, however, the cover apparatus 200 could be longer or shorter, and is not limited to the dimensions disclosed herein.

The cover apparatus 200 includes a first cover portion 300. The first cover portion 300 defines a substantially hollow interior portion that can receive and cover a portion of the electrical insulator 208 and/or a portion of the conductor 210. The first cover portion 300 is elongated and extends along a first axis 302. In an example, the first axis 302 is generally linear, though in other examples, the first cover portion 300 can have bends, curves, or the like. Likewise, due to the material forming the first cover portion 300, the first cover portion 300 can have at least some degree of flexibility/bending, such that the first cover portion 300 may not extend along a linear axis at all times or throught a length of the first cover portion (e.g., and this is true of other parts of the cover apparatus 200 as well).

The first cover portion 300 includes a first segment 308. The first segment 308 is generally hollow so as to support/receive structures therein. In an example, the first segment 308 can cover at least a portion of the electrical insulator 208 and/or at least a portion of the conductor 210.

The first segment 308 includes a first housing portion 310. In an embodiment, the first housing portion 310 is a rounded, generally circularly shaped structure with a hollow center portion. The first housing portion 310 is sized and shaped so as to receive at least a portion of the electrical insulator 208 therein. In an example, the first housing portion 310 can be large enough so as to receive the electrical insulator 208 therein, such that the first housing portion 310 may be larger or slightly larger in size than the electrical insulator 208. The first housing portion 310 is not limited to the generally circular shape that is illustrated. Rather, the first housing portion 310 can instead include quadrilateral shapes (e.g., square, rectangular, etc.), oval shapes, or the like. Likewise, the first housing portion 310 can be larger or smaller in size than as illustrated, depending, at least in part, on the size(s) of the electrical insulator 208 and/or the conductor 210.

The first segment 308 can include a first extension portion 312. The first extension portion 312 can be coupled to the first housing portion 310. In an example, the first extension portion 312 can be integrally formed with the first housing portion 310, such that the first housing portion 310 and first extension portion 312 are generally a composite structure. In an example, the first housing portion 310 and first extension portion 312 can be separately attached to each other, such as by adhesives, mechanical fasteners, molding, etc.

The first extension portion 312 can cover at least a portion of the electrical insulator 208 and/or at least a portion of the conductor 210. In the illustrated example, the first extension portion 312 is generally hollow, so as to receive the electrical insulator 208 and/or the conductor 210 therein. The first extension portion 312 can extend along the first axis 302 in a direction away from the first housing portion 310.

The first segment 308 can comprise at least one opening. In an example, the at least one opening includes a first opening 316 and a second opening 318 (e.g., illustrated in FIG. 4) disposed on opposing sides of the first segment 308. For example, the first opening 316 and second opening 318 can be positioned on opposing sides of the first housing portion 310. The first opening 316 and second opening 318 can each include generally elongated openings that extend substantially parallel to the first axis 302. It is to be appreciated that due to the curvature of the first housing portion 310, the first opening 316 and second opening 318 also include at least some degree of curvature. Even with this degree of curvature, the first opening 316 and second opening 318 can still extend substantially parallel to the first axis 302. In an example, the first openings 316 and second opening 318 can extend generally parallel to each other. It is to be appreciated that in further examples, the first opening 316 and second opening 318 are not limited to extending generally parallel to the first axis 302, and instead could be oriented at an angle with respect to the first axis 302.

The first cover portion 300 includes a second segment 320. The second segment 320 is coupled to the first segment 308, such as at the first extension portion 312, and can cover at least a first portion 212 of the conductor 210. The second segment 320 can be coupled to the first segment 308 in any number of ways. In an example, the second segment 320 can be integrally formed with the first segment 308, such that the second segment 320 and first segment 308 are generally a composite structure. In an example, the second segment 320 can be separately attached to the first segment 308, such as by adhesives, mechanical fasteners, molding, etc.

The second segment 320 is generally hollow so as to support/receive structures therein. In an example, the second segment 320 can cover at least a portion of the first portion 212 of the conductor 210. In such an example, the second segment 320 can receive the portion of the first portion 212 therein. It is to be appreciated that the second segment 320 can extend a longer or shorter distance than as illustrated herein, such that the second segment 320 can cover a longer or shorter portion of the first portion 212.

The cover apparatus 200 can include a second cover portion 330. The second cover portion 330 defines a substantially hollow interior portion that can receive a portion of the electrical insulator 208 and/or a portion of the conductor 210. The second cover portion 330 can therefore cover at least a portion of the electrical insulator 208 and/or the conductor 210. The second cover portion 330 is elongated and extends along a second axis 332. In an example, the second axis 332 is generally linear, though in other examples, the second cover portion 330 can have bends, curves, or the like. Likewise, due to the material forming the second cover portion 330, the second cover portion 330 can have at least some degree of flexibility/bending, such that the second cover portion 330 may not extend along a linear axis at all times.

The second cover portion 330 includes a third segment 334. The third segment 334 is generally hollow so as to support/receive structures therein. In an example, the third segment 334 can cover at least a portion of the electrical insulator 208 and at least a portion of the conductor 210. The third segment 334 can be movably attached to the first segment 308.

The third segment 334 includes a second housing portion 338. In an embodiment, the second housing portion 338 is a rounded, half-circle shaped structure with a hollow center portion. The second housing portion 338 is sized and shaped so as to receive at least a portion of the first housing portion 310 therein. In an example, the second housing portion 338 can be large enough so as to receive the first housing portion 310, such that the second housing portion 338 may be larger or slightly larger in size than the first housing portion 310. The second housing portion 338 is not limited to the generally circular (e.g., half-circle) shape that is illustrated. Rather, the second housing portion 338 can instead include quadrilateral shapes (e.g., square, rectangular, etc.), oval shapes, or the like. Likewise, the second housing portion 338 can be larger or smaller in size than as illustrated, depending, at least in part, on the size(s) of the first housing portion 310, the electrical insulator 208, and/or the conductor 210.

The third segment 334 can include a second extension portion 340. The second extension portion 340 can be coupled to the second housing portion 338. In an example, the second extension portion 340 can be integrally formed with the second housing portion 338, such that the second extension portion 340 and second housing portion 338 are generally a composite structure. In another example, the second housing portion 338 and second extension portion 340 can be separately attached to each other, such as by adhesives, mechanical fasteners, molding, etc.

The second extension portion 340 can cover at least a portion of the electrical insulator 208 and/or at least a portion of the conductor 210. In the illustrated example, the second extension portion 340 is generally hollow, so as to receive the electrical insulator 208 and/or the conductor 210 therein. The second extension portion 340 can extend along the second axis 332 in a direction away from the second housing portion 338.

The third segment 334 can include at least one opening. In an example, the at least one opening includes a third opening 342 and a fourth opening 344 (e.g., illustrated in FIG. 4) located on opposing sides of the third segment 334. For example, the third opening 342 and fourth opening 344 can be positioned on opposing sides of the second housing portion 338. The third opening 342 and fourth opening 344 can be generally aligned with the first opening 316 and the second opening 318, respectively. For example, the third opening 342 can be aligned with the first opening 316 when the third segment 334 is movably attached to the first segment 308. Likewise, the fourth opening 344 can be aligned with the second opening 318 when the third segment 334 is movably attached to the first segment 308.

The second cover portion 330 includes a fourth segment 346. The fourth segment 346 is coupled to the third segment 334, such as at the second extension portion 340, and can cover at least a second portion 214 of the conductor 210. The fourth segment 346 can be coupled to the third segment 334 in any number of ways. In an example, the fourth segment 346 can be integrally formed with the third segment 334, such that the fourth segment 346 and third segment 334 are generally a composite structure. In an example, the fourth segment 346 can be separately attached to the third segment 334, such as by adhesives, mechanical fasteners, molding, etc.

The fourth segment 346 is generally hollow so as to support/receive structures therein. In an example, the fourth segment 346 can cover at least a portion of the second portion 214 of the conductor 210. In such an example, the fourth segment 346 can receive the portion of the second portion 214 therein. It is to be appreciated that the fourth segment 346 can extend a longer or shorter distance than as illustrated herein, such that the fourth segment 346 can cover a longer or shorter portion of the second portion 214.

The cover apparatus 200 can include at least one attachment device to facilitate movable attachment of the third segment 334 to the first segment 308. For example, the at least one attachment device can include a first attachment device 350 and a second attachment device 352 (e.g., illustrated in FIG. 4). The first attachment device 350 and second attachment device 352 can include any number of attachment devices, including mechanical fasteners (e.g., nuts, bolts, screws, etc.) and/or the like. In an example, the first attachment device 350 and second attachment device 352 can each include an elongated fastener that has an enlarged head and/or restraining portion (e.g., nut, etc.) at one or both ends so as to reduce the likelihood of the attachment devices from inadvertently becoming dislodged from their openings. In an example, at least one of the first attachment device 350 and second attachment device 352 can be integrally formed with (e.g., one piece formed) the third segment 334 and/or the first segment 308, such that at least one of the attachment devices may be generally non-removable from the third segment 334 and/or the first segment 308.

The first attachment device 350 can be located within the first opening 316 and the third opening 342 to facilitate the movable attachment of the third segment 334 to the first segment 308. The first attachment device 350 can extend through the first opening 316 and the third opening 342, and is limited from being removed, dislodged, etc. from these openings. The second attachment device 352 can be located within the second opening 318 and the fourth opening 344 to facilitate the movable attachment of the third segment 334 to the first segment 308. The second attachment device 352 can extend through the second opening 318 and the fourth opening 344, and is limited from being removed, dislodged, etc. from these openings.

In an example, the first attachment device 350 and second attachment device 352 are each sized/shaped to generally match the size/shape of the third opening 342 and fourth opening 344, respectively. For example, the first attachment device 350 and second attachment device 352 can be slightly larger in size than the third opening 342 and fourth opening 344, respectively. As such, the first attachment device 350 and second attachment device 352 are generally limited from lateral movement within the third opening 342 and fourth opening 344. However, the first attachment device 350 and second attachment device 352 can still allow for pivoting/rotational movement within the third opening 342 and fourth opening 344.

In operation, the first attachment device 350 is movable within the first opening 316 to facilitate the movable attachment of the third segment 334 to the first segment 308. Likewise, the second attachment device 352 is movable within the second opening 318 to facilitate the movable attachment of the third segment 334 to the first segment 308.

In an example, the first attachment device 350 and second attachment device 352 can move (e.g., slide, translate, travel, etc.) within the first opening 316 and second opening 318, respectively while remaining relatively non-moving with respect to the third opening 342 and fourth opening 344. As such, the second cover portion 330 can likewise move side to side with respect to the first cover portion 300. This side to side movement can be limited based, at least in part, on the lengths of the first opening 316 and second opening 318. In an example, the second cover portion 330 is capable of approximately +/−30° side to side movement. This degree of movement is not intended to be limiting, and in other examples, the lengths of first opening 316 and second opening 318 could be longer or shorter and/or different from one another, so as to provide for a larger or smaller degree (e.g., larger or smaller than 30°) and/or an asymmetric degree of side to side movement.

In addition, the first attachment device 350 can allow for pivoting or rotational movement with respect to either or both of the first opening 316 and third opening 342. Likewise, the second attachment device 352 also can allow for pivoting or rotational movement with respect to either or both of the second opening 318 and fourth opening 344. As such, the second cover portion 330 can move up and down or vertically (e.g., relative to the surface of the material into which the utility pole is mounted) with respect to the first cover portion 300.

To limit the degree of (e.g., vertical) movement of the second cover portion 330 with respect to the first cover portion 300 (or vice versa), the cover apparatus 200 can include one or more attachment structures. In an example, the one or more attachment structures include a first attachment structure 360 and a second attachment structure 362. The first attachment structure 360 can be located on (e.g., formed with, attached to, etc.) the first housing portion 310 of the first segment 308 while the second attachment structure 362 can be located on (e.g., formed with, attached to, etc.) the second housing portion 338 of the third segment 334. In the illustrated example, the first attachment structure 360 and second attachment structure 362 include a central opening surrounded and enclosed by a perimeter portion (e.g., shaft, rounded structure, etc.). It is to be appreciated that the first attachment structure 360 and second attachment structure 362 are not limited to the illustrated example, and could include any number of sizes, shapes, and constructions.

A restraining structure 364 can engage the first attachment structure 360 and second attachment structure 362. For example, a first end 366 of the restraining structure 364 can be attached to the first segment 308, such as at the first attachment structure 360, while an opposing second end 368 of the restraining structure 364 can be attached to the third segment 334, such as at the second attachment structure 362. The restraining structure 364 can include any number of structures, such as ropes, cables, ties, springs, or the like. In operation, the restraining structure 364 can limit movement (e.g., up and down and/or side to side movement) between the third segment 334 and the first segment 308. In an example, the restraining structure 364 can allow for movement of approximately +/−15° in the up/down (e.g., vertical) direction. It is appreciated, however, that this degree of movement is not intended to be limiting, and that in other examples, the restraining structure 364 can allow for a larger or smaller (e.g., larger or smaller than +/−15°) degree of movement.

Figure 4:
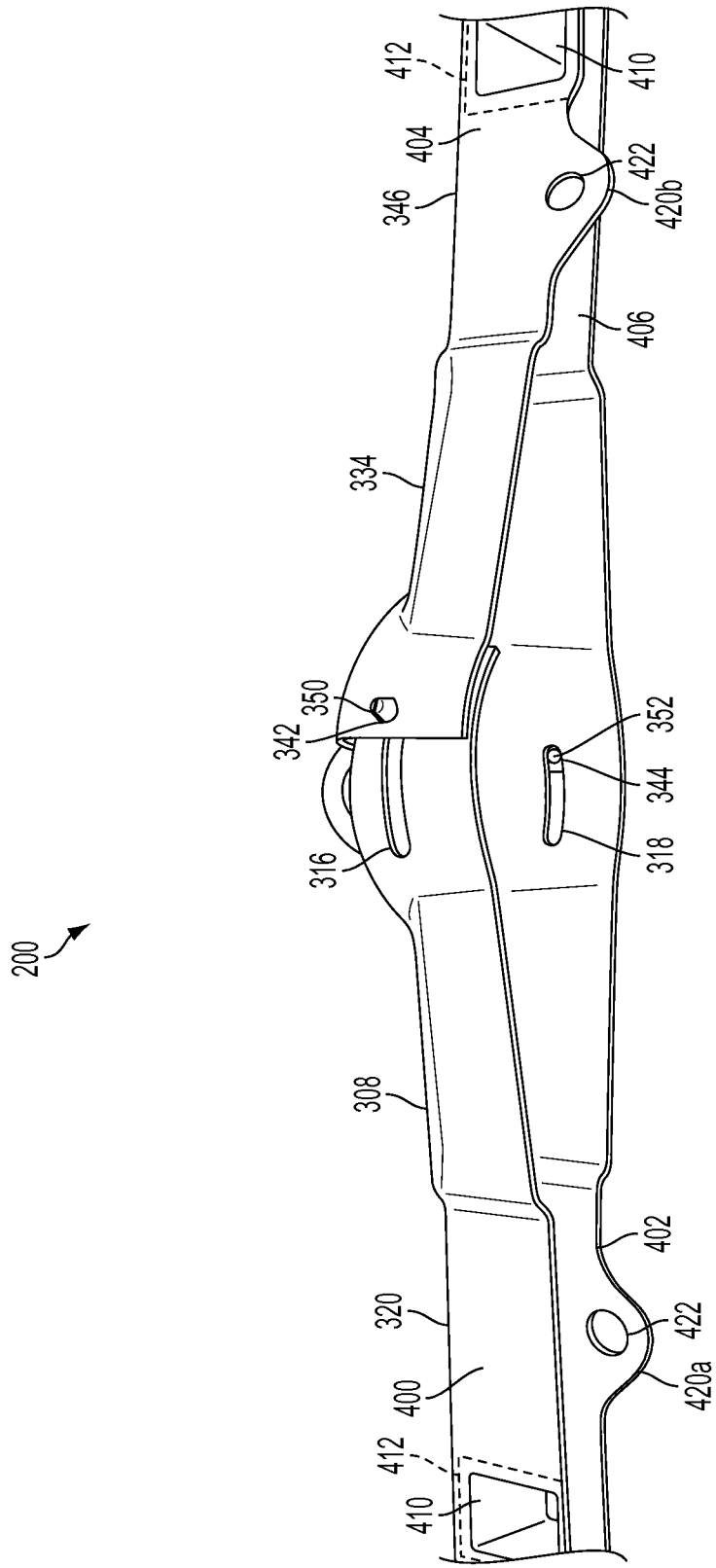
FIG. 4 is an illustration an underside of an example cover apparatus.

Turning now to FIG. 4, an underside view of the cover apparatus 200 is illustrated. In the illustrated example, the second opening 318, fourth opening 344, and second attachment device 356 can now be seen, as these structures were obscured from view in FIG. 3.

The first cover portion 300 includes a first wall 400 and a second wall 402. The first wall 400 and second wall 402 can extend along and at least partially form the first segment 308 and the second segment 320. The first wall 400 and second wall 402 extend generally parallel to each other along the first axis 302. The first wall 400 and second wall 402 are spaced apart to define a hollow interior that is sized/shaped to receive the electrical insulator 208 and conductor 210.

The second cover portion 330 includes a third wall 404 and a fourth wall 406. The third wall 404 and fourth wall 406 can extend along and at least partially form the third segment 334 and fourth segment 346. The third wall 404 and fourth wall 406 extend generally parallel to each other along the second axis 332. The third wall 404 and fourth wall 406 are spaced apart to define a hollow interior that is sized/shaped to receive the electrical insulator 208 and conductor 210.

The cover apparatus 200 can include one or more attachment openings 410. In the illustrated example of FIG. 4, two attachment openings 410 are illustrated. The cover apparatus 200 is not limited to this number, however, and in other examples, such as the illustrated example of FIG. 2, the cover apparatus 200 can include four attachment opening 410. In other examples, the cover apparatus 200 includes any number of attachment openings.

The attachment openings 410 can each include an opening extending through a pair of walls. For instance, the attachment openings 410 can extend from the first wall 400 and through the second wall 402. In an example, the attachment openings 410 can extend from the third wall 404 and through the fourth wall 406. In either of these examples, the attachment openings 410 can receive a securing item 800 (e.g., illustrated and described with respect to FIG. 8) to secure and maintain the conductor 210 within the cover apparatus 200. In the illustrated example, the attachment openings 410 can project inwardly towards a center of the cover apparatus 200, so as to grip and hold the conductor 210 therein. For example, the walls may be somewhat rigid and may comprise indentations wherein the attachment openings 410 are formed. A space between opposing indentations in opposing walls may be slightly less than a diameter of the conductor 210 such that opposing indentations apply a bias or (e.g., frictional) force against the conductor when the conductor 210 is situated in the space between opposing indentations. In an example, to install the cover apparatus 200 onto the conductor 210 the cover apparatus is (e.g., forcibly) pulled onto the conductor 210 (e.g., 'snapped' down over, onto, etc. the conductor) such that the conductor passes through the somewhat narrow spaces between opposing indentations. As such, once the cover apparatus 200 is installed, the indentations facilitate maintaining the cover apparatus 200 on the conductor 210.

In an example, the attachment openings 410 can include a relief portion 412. The relief portion 412 defines a cut, perforated, or punctured area surrounding the attachment openings 410 in one of the walls. The relief portion 412 is depicted somewhat generically/schematically in FIG. 4 with dashed lines. In an example, the relief portion 412 includes a quadrilateral shape (e.g., rectangular, square, etc.), though other shapes, such as circular, oval, etc. are envisioned. The relief portion 412 can allow for at least some degree of flexibility to an area surrounding the attachment openings 410. Such flexibility can allow for bending/flexing when the cover apparatus 200 is pulled downwardly onto the conductor 210. The relief portion 412 can flex outwardly in response to contacting/engaging the conductor 210, before flexing back into place when the conductor 210 is received within the cover apparatus 200. In an example, the relief portion 412 can be formed in the first wall 400 surrounding the attachment opening 410 (e.g., but not in the second wall 402 comprising an opposing attachment opening). As such, the securing item 800 can be inserted from the first wall 400 to the second wall 402. In this manner, the relief portion 412 allows for flexing/bending in the first wall 400 as the cover apparatus 200 is installed on to the conductor 210 but does not 'flex away from' the securing item 800 when the securing item 800 is installed (e.g., pushed through) from the first wall 400 to the second wall 402.

The cover apparatus 200 can include one or more gripping structures 420. The gripping structures 420 can be supported by the walls. In an example, a first gripping structure 420a can be supported by the second wall 402 while a second gripping structure 420b can be supported by the third wall 404. As illustrated, adjacent the gripping structures 420 can be positioned on opposing walls. Along these lines, a third gripping structure 420c (e.g., illustrated in FIG. 2) can be supported by the first wall 400 while a fourth gripping structure 420d (e.g., illustrated in FIG. 2) can be supported by the fourth wall 406. The cover apparatus 200 is not specifically limited to the gripping structures 420 being located on alternating walls. Rather, in an example, the gripping structures 420 could instead be positioned on walls on the same side (e.g., the first wall 400 and third wall 404 or the second wall 402 and fourth wall 406).

The gripping structures 420 each include a gripping opening 422. The gripping opening 422 can allow for a structure, such as an insulated pole (e.g., "hot stick") or the like, to grip the gripping structures 420 through the gripping opening 422. In the illustrated example, due to the gripping structures 420 being located on opposing walls, the insulated pole can more easily provide a downward, pulling force to the cover apparatus 200 on both sides of the electrical insulator 208 and conductor 210. This downward, pulling force is sufficient to cause the relief portion 412 to flex outwardly so as to receive the conductor 210 within the cover apparatus 200.

Figure 5:
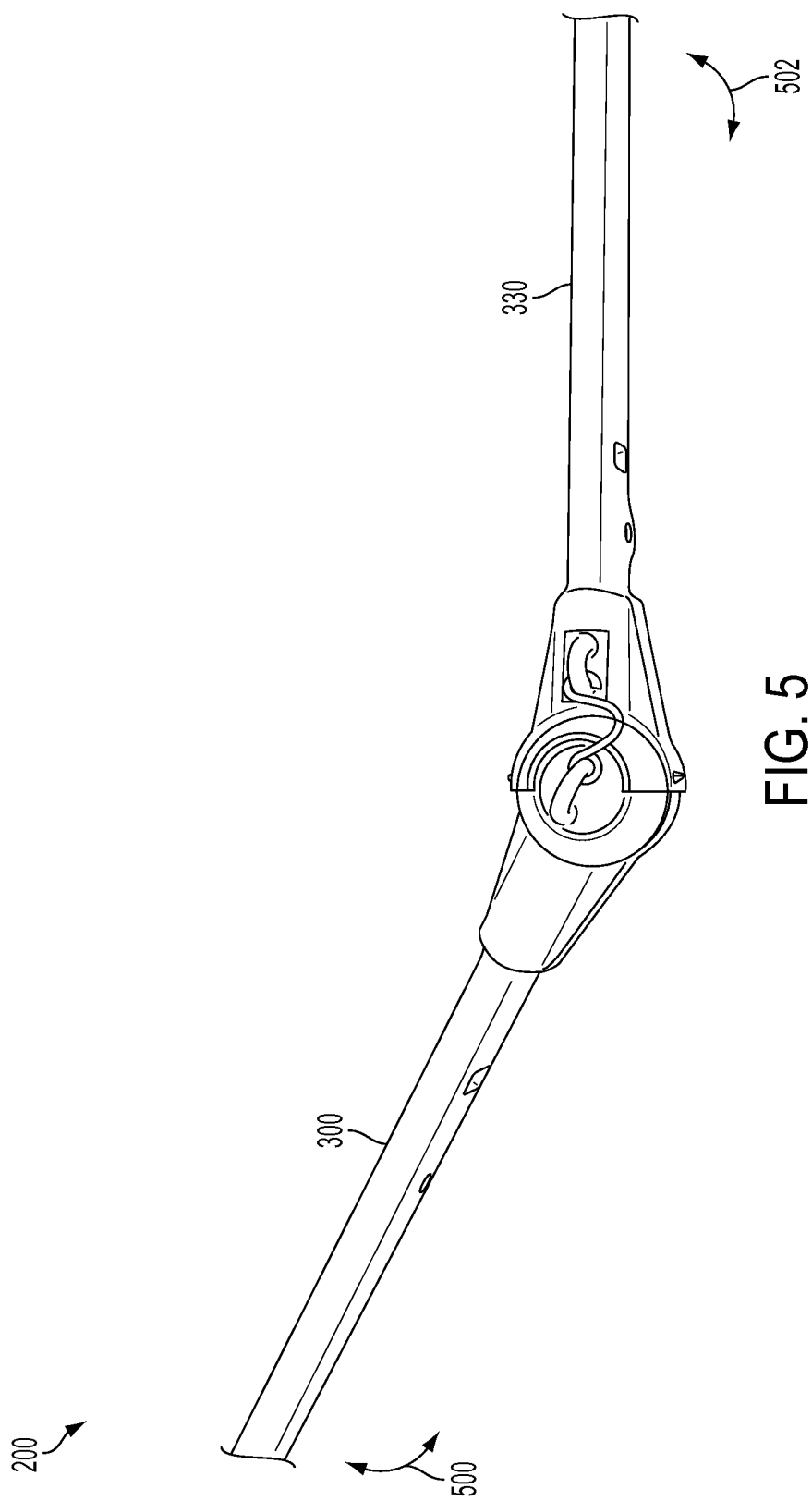
FIG. 5 is an illustration of an example cover apparatus having a first cover portion movably attached with respect to a second cover portion.
Figure 6:
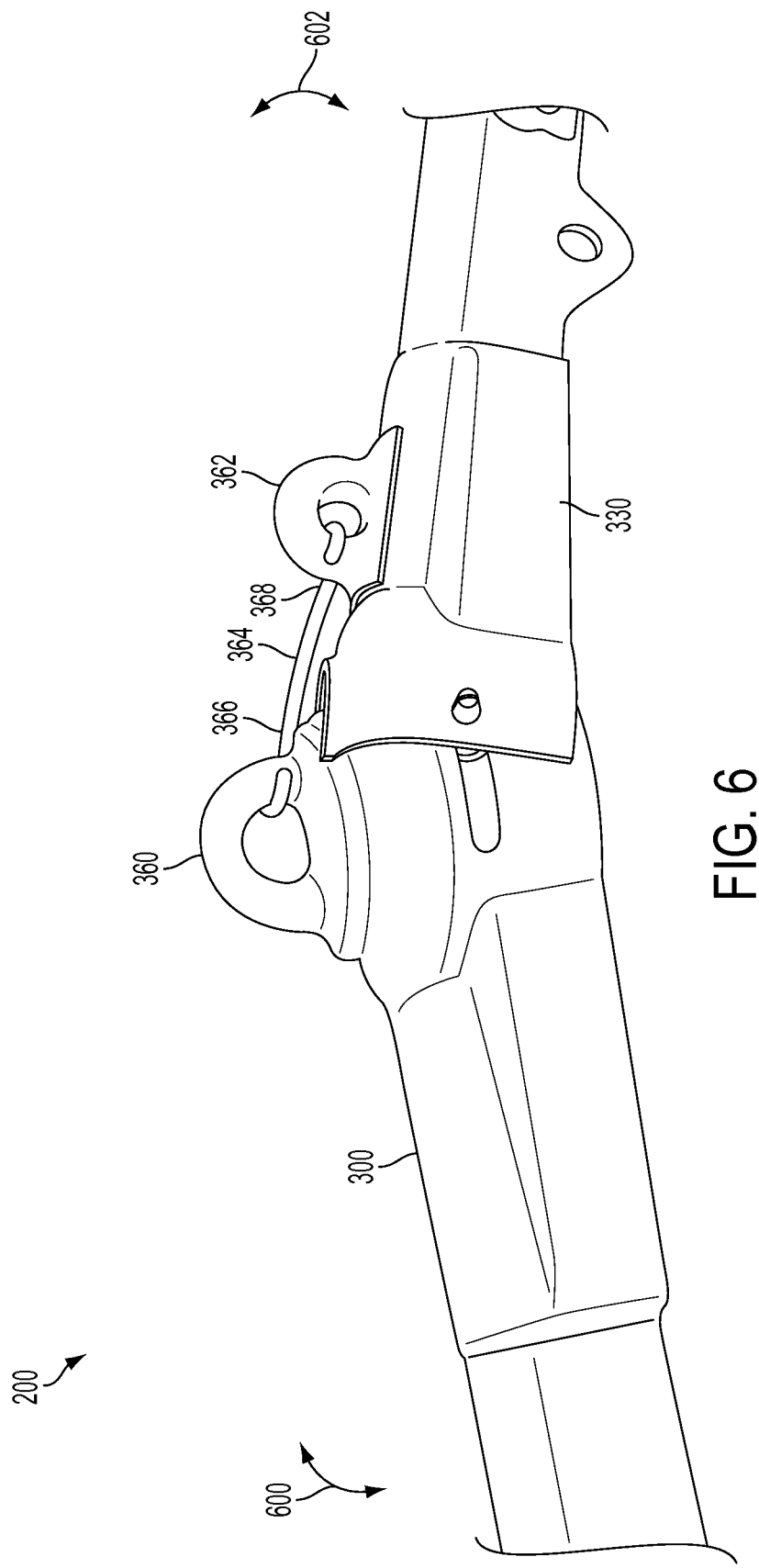
FIG. 6 is an illustration of an example cover apparatus having a first cover portion movably attached with respect to a second cover portion.

Turning now to FIG. 5, an example of a method of operating the cover apparatus 200 is illustrated. In this example, portions of the cover apparatus 200 can be moved to accommodate for a non-linearly extending conductor 210. In some examples, the first portion 212 and the second portion 214 of the conductor 210 may be non-coaxial. For example, the first axis 302 and the second axis 332 can be non-coaxial when the third segment is attached to the first segment at a second orientation (e.g., as illustrated in FIG. 5 or 6, for example). In such an example, the first portion 212 of the conductor 210 can extend generally along the first axis 302 up to the electrical insulator 208. The second portion 214 of the conductor 210 can extend generally along the second axis 332 up to the electrical insulator 208, the second axis 332 being non-coaxial with respect to the first axis 302. In such an example, the cover apparatus 200 can be adjusted to accommodate for these non-coaxial axes of the first portion 212 and second portion 214.

In this example, the first cover portion 300 can be moved with respect to the second cover portion 330. For example, the first cover portion 300 and second cover portion 330 can move with respect to each other due to the engagement between the first attachment structure 360 and the first opening 316 and the engagement between the second attachment structure 362 and the second opening 318. The first cover portion 300 can be moved along a first movement direction 500. As described above, the first cover portion 300 can move, for example, approximately +/−30° side to side with respect to the second cover portion 330. In the alternative, the second cover portion 330 can move with respect to the first cover portion 300. For example, the second cover portion 330 can be moved along a second movement direction 502, approximately +/−30° side to side with respect to the first cover portion 300. However, as set forth above, the degree of movement is not limited to +/−30°, and in other examples, could be larger or smaller.

Turning now to FIG. 6, the first cover portion 300 can be moved up and down with respect to the second cover portion 330 to accommodate for the first portion 212 and second portion 214 of the conductor 210 extending along non-coaxial axes. For example, the first cover portion 300 can be moved along a third movement direction 600. As described above, the first cover portion 300 can move, for example, approximately +/−15° up and down with respect to the second cover portion 330. In the alternative, the second cover portion 330 can move with respect to the first cover portion 300. For example, the second cover portion 330 can be moved along a fourth movement direction 602, approximately +/−15° up and down with respect to the first cover portion 300. However, as set forth above, the degree of movement is not limited to +/−15°, and in other examples, could be larger or smaller.

Figure 7:
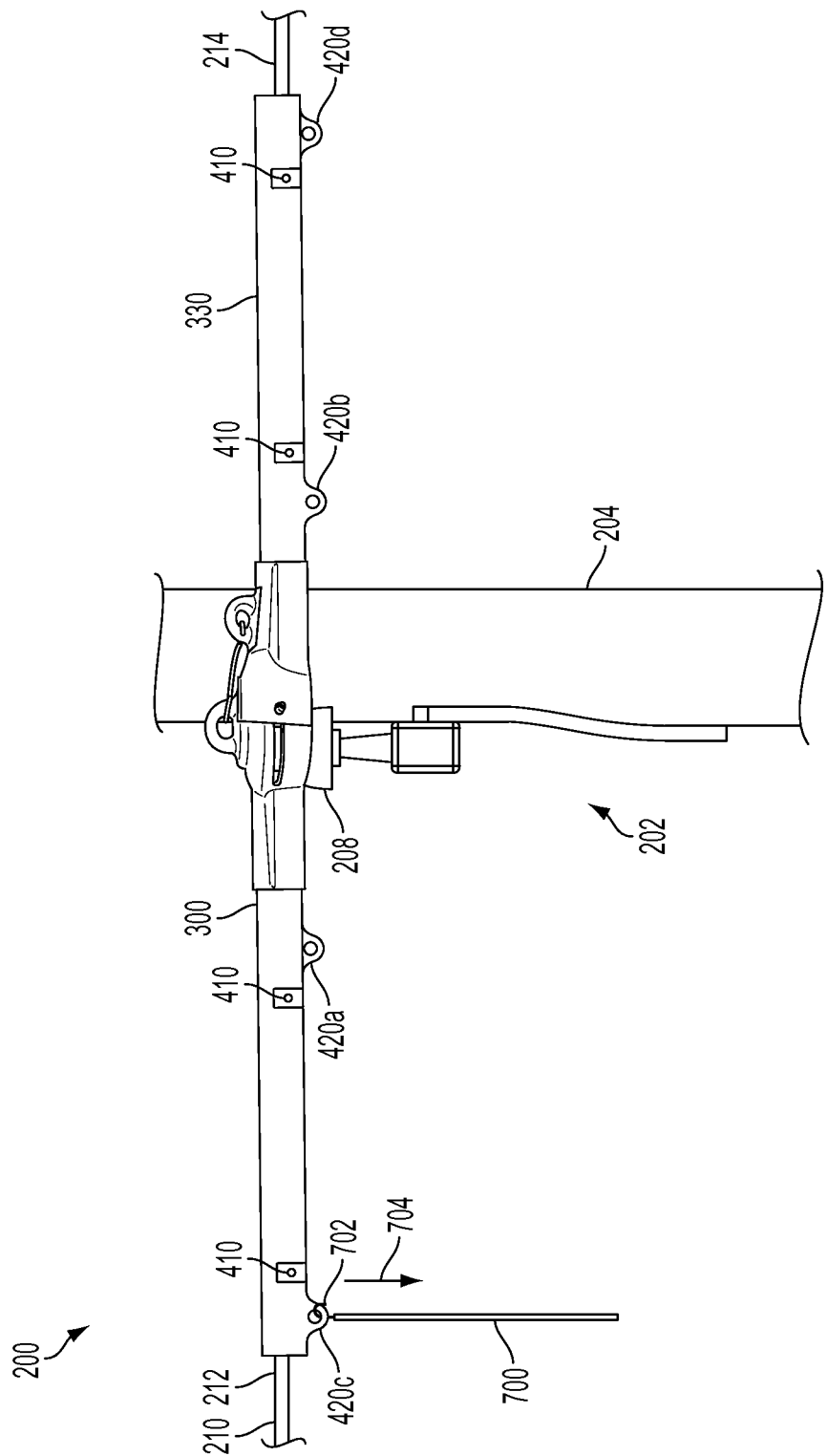
FIG. 7 is an illustration of an example cover apparatus attached to an electrical structure.

Turning now to FIG. 7, the cover apparatus 200 is illustrated as fully attached to the electrical structure 202. In this example, to attach the cover apparatus 200 to the electrical structure 202, an insulated pole 700 can be used. The insulated pole 700 is somewhat generically/schematically depicted, as the insulated pole 700 includes any number of sizes/shapes/constructions (e.g., longer or shorter in length, etc.). The insulated pole 700 can be handled and operated by a user.

The insulated pole 700 includes a hooked portion 702. The hooked portion 702 is disposed at an end of the insulated pole 700. The hooked portion 702 is sized to be received within the gripping openings 422 of the gripping structure 420. In this example, the hooked portion 702 of the insulated pole 700 is illustrated as engaging the third gripping structure 420c, though the insulated pole 700 can similarly engage the first gripping structure 420a, second gripping structure 420b, and/or fourth gripping structure 420d. In this example, the user can exert a pulling force 704 on the cover apparatus 200. The pulling force 704 can, in an example, be directed downwards. The pulling force 704 is sufficient to pull the cover apparatus 200 onto the electrical structure 202 (e.g., conductor 210, electrical insulator 208, etc.).

The first cover portion 300 can cover the first portion 212 of the conductor 210. Similarly, the second cover portion 330 can cover the second portion 214 of the conductor 210. In this example, the first housing portion 310 and second housing portion 338 can cover the electrical insulator 208. The insulated pole 700 and hooked portion 702 can at times engage some or all of the gripping structures 420a-420d, and apply the pulling force 704 to each of the gripping openings 422.

Figure 8:
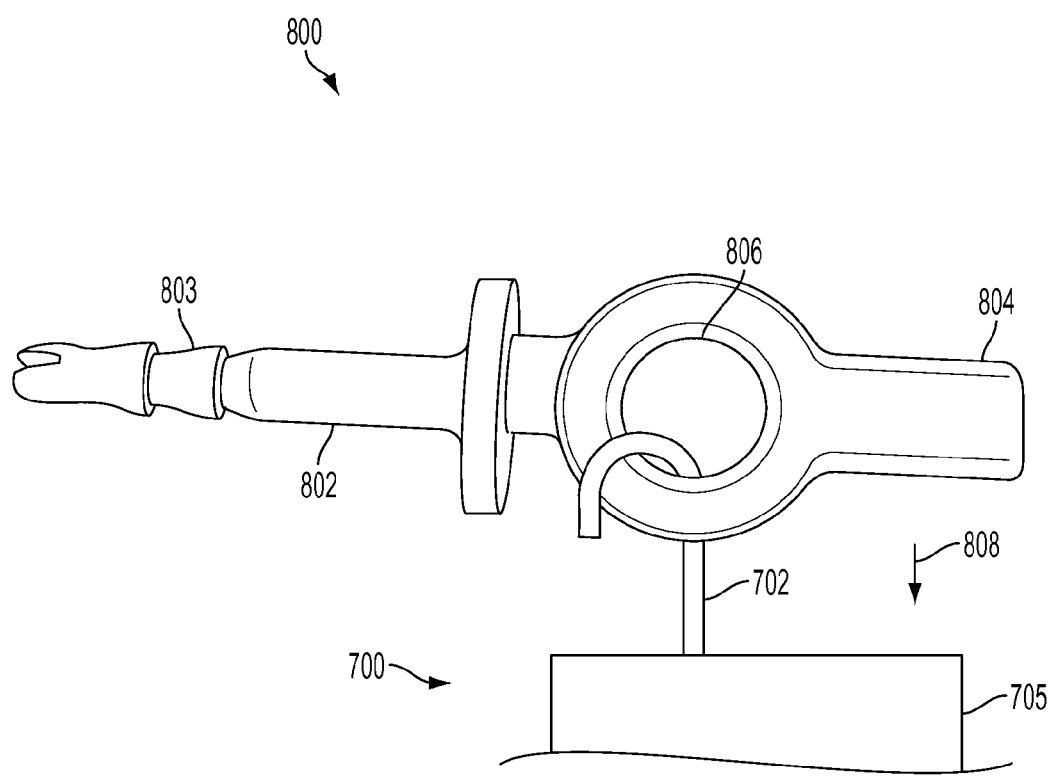
FIG. 8 is an illustration of an example securing item for securing a cover apparatus to an electrical structure.

Turning now to FIG. 8, the cover apparatus 200 can include one or more securing items 800, such as securing pins, for example, for attaching the cover apparatus 200 to the electrical structure 202. While only one securing item 800 is illustrated in this example, the remaining securing items 800 can be generally identical in size, structure, and construction. In operation, the securing items 800 can be inserted through the attachment openings 410.

The securing item 800 can include an insertion portion 802. The insertion portion 802 is an elongated, substantially linear extending protrusion that can be received within the attachment opening 410. In an example, a cross-sectional size of the insertion portion 802 can be slightly smaller than the cross-sectional size of the attachment openings 410 such that the insertion portion 802 can be received therein. In an example, the insertion portion 802 can include one or more ribs 803 to assist in limiting inadvertent removal of the securing item 800 from the attachment openings 410. The ribs can engage, for example, edges of the attachment openings 410 to limit this removal. The insertion portion 802 comprises any number of lengths, though in an example, the insertion portion 802 can be long enough to pass through opposing attachment openings 410 in opposing walls of the cover apparatus 200.

The securing item 800 can include an engagement portion 804 disposed at an opposite end of the securing item 800 relative to the insertion portion 802. The engagement portion 804 is an elongated, substantially linearly extending protrusion. The engagement portion 804 is not limited to the dimensions as illustrated, and in other examples, could be longer or shorter in length and/or include a larger or smaller cross-sectional size.

The securing item 800 can include a pin opening 806. In the illustrated example, the pin opening 806 can be positioned between the insertion portion 802 on one side and the engagement portion 804 on an opposing second side. The pin opening 806 in this example has a generally rounded shape, though other shapes are envisioned. For instance, in other examples, the pin opening 806 can have a larger or smaller size and/or could include other shapes, such as quadrilateral shapes (e.g., square, rectangular, etc.), oval shapes, or the like.

During insertion, the pin opening 806 can receive the hooked portion 702. In an example, the hooked portion 702 can be moved relative to a pole body 704 of the insulated pole 700. For example, the hooked portion 702 can be moved in the retracting direction 808 while the pole body 705 can remain relatively stationary. This retraction can improve the gripping performance of the securing item 800 by the insulated pole 700. Upon retraction, the engagement portion 804 can contact and engage the pole body 705. This engagement allows for the insertion portion 802 to extend outwardly from the insulated pole 700 in a direction that is generally perpendicular to a direction along which the insulated pole 700 extends. Accordingly, inadvertent twisting/rotating of the securing item 800 is limited, along with inadvertent release of the securing item 800 from the hooked portion 702.

In operation, the insulated pole 700 can grip and hold the securing item 800, as illustrated. The hooked portion 702 is moved in the retracting direction 808 until the engagement portion 804 contacts and engages the pole body 705. At this point, the insertion portion 802 can extend outwardly from the pole body 705, in a similar direction as illustrated in FIG. 8. The user can then hold and manipulate the insulated pole 700 to insert the securing item 800 into the attachment openings 410. It will be appreciated that the configuration of the securing item, such as by comprising the engagement portion 804, allows the securing item 800 (e.g., as measured along a longest length of the securing item 800 from a distal end of the engagement portion 804 to a distal end of the insertion portion 802) to be substantially perpendicular to a longest length of the pole body 705 when engaged by the insulated pole 700. This arrangement of the securing item 800 to the pole 700 allows a user to more easily insert the securing item 800 into a pair of opposing attachment openings in opposing walls of the cover apparatus 200. For example, a user standing on the surface of the material into which the utility pole is mounted may be able to thread the securing item into attachment openings 410. In the absence of the engagement portion 804, for example, the securing item 800 may be able to move around and/or otherwise be less secure when engaged by the pole 700, making it more difficult to insert the securing item 800 into engagement openings 410. In an example of the absence of the engagement portion 804, the securing item 800 may be substantially parallel to the pole 700 (e.g., longest length of securing item 800 is parallel to (e.g., and extends further along) longest length of the pole body 705). In such an arrangement, it may be difficult for a user standing the surface of the material to insert the securing item 800 into engagement openings 410. For example, the user may have to be elevated (e.g., via a bucket truck) so that an axis along the length of the pole 700 and the securing item 800 aligns with an axis passing through a pair of opposing attachment openings in opposing walls of the cover apparatus 200 to be able to insert the securing item 800 into the pair of engagement openings. Thus, the engagement portion 804 facilitates fewer complexities or requirements to install the securing item 800. Accordingly, the engagement portion is dimensioned to facilitate an arrangement of the securing item 800 to the pole 700 to allow more user friendly installation of the securing item 800 to the cover apparatus 200.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first cover portion and a second cover portion generally correspond to cover portion A and cover portion B or two different or two identical cover portions or the same cover portions.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A cover apparatus for covering an electrical insulator and an electrical conductor, the cover apparatus comprising:
   a first cover portion extending along a first axis, the first cover portion comprising:
      a first segment configured to cover a first portion of the electrical insulator; and
      a second segment coupled to the first segment and configured to cover a first portion of the electrical conductor; and
   a second cover portion extending along a second axis, the second cover portion comprising:
      a third segment movably attached to the first segment to provide at least one of up and down movement or side to side movement between the third segment and the first segment; and
      a fourth segment coupled to the third segment and configured to cover a second portion of the electrical conductor.

2. The cover apparatus of claim 1, wherein the first axis and the second axis are coaxial when the third segment is attached to the first segment at a first orientation.

3. The cover apparatus of claim 1, wherein the first axis and the second axis are non-coaxial when the third segment is attached to the first segment at a second orientation.

4. The cover apparatus of claim 1, wherein the first segment comprises at least one opening.

5. The cover apparatus of claim 4, wherein the at least one opening comprises a first opening and a second opening disposed on opposing sides of the first segment.

6. The cover apparatus of claim 5, wherein the first opening and the second opening extend substantially parallel to the first axis.

7. The cover apparatus of claim 5, wherein the third segment comprises a third opening and a fourth opening, the third opening aligned with the first opening when the third segment is movably attached to the first segment, and the fourth opening aligned with the second opening when the third segment is movably attached to the first segment.

8. The cover apparatus of claim 7, comprising:
   a first attachment device located within the first opening and the third opening to facilitate movably attaching the third segment to the first segment; and
   a second attachment device located within the second opening and the fourth opening to facilitate movably attaching the third segment to the first segment.

9. The cover apparatus of claim 8, wherein the first attachment device is movable within the first opening to facilitate movably attaching the third segment to the first segment, and wherein the second attachment device is movable within the second opening to facilitate movably attaching the third segment to the first segment.

10. The cover apparatus of claim 1, comprising a restraining structure attached at a first end to the first segment and attached at an opposing second end to the third segment, the restraining structure configured to limit the at least one of up and down movement or side to side movement between the third segment and the first segment.

11. A cover apparatus for covering an electrical insulator and an electrical conductor, the cover apparatus comprising:
   a first cover portion extending along a first axis, the first cover portion comprising:
      a first segment configured to cover a first portion of the electrical insulator; and
      a second segment coupled to the first segment and configured to cover a first portion of the electrical conductor; and
   a second cover portion extending along a second axis, the second cover portion comprising:
      a third segment movably attached to the first segment and configured to cover a second portion of the electrical insulator; and
      a fourth segment coupled to the third segment and configured to cover a second portion of the electrical conductor; and
   a restraining structure attached to at least one of the first cover portion or the second cover portion, the restraining structure configured to limit at least one of UP and down movement or side to side movement between the third segment and the first segment.

12. The cover apparatus of claim 11, wherein the first axis and the second axis are coaxial when the third segment is attached to the first segment at a first orientation.

13. The cover apparatus of claim 11, wherein the first axis and the second axis are non-coaxial when the third segment is attached to the first segment at a second orientation.

14. The cover apparatus of claim 11, wherein the first segment comprises at least one opening.

15. The cover apparatus of claim 14, wherein the at least one opening comprises a first opening and a second opening disposed on opposing sides of the first segment.

16. The cover apparatus of claim 15, wherein the third segment comprises a third opening and a fourth opening, the third opening aligned with the first opening when the third segment is movably attached to the first segment, and the fourth opening aligned with the second opening when the third segment is movably attached to the first segment.

17. The cover apparatus of claim 16, comprising:
   a first attachment device located within the first opening and the third opening, the first attachment device movable within the first opening to facilitate movably attaching the third segment to the first segment; and
   a second attachment device located within the second opening and the fourth opening, the second attachment device movable within the second opening to facilitate movably attaching the third segment to the first segment.

18. A method of forming a cover apparatus for covering an electrical insulator and an electrical conductor, comprising:
   providing a first cover portion extending along a first axis, the first cover portion comprising a first segment configured to cover a first portion of the electrical insulator and a second segment coupled to the first segment and configured to cover a first portion of the electrical conductor; and
   attaching a second cover portion to the first cover portion, the second cover portion extending along a second axis, the second cover portion comprising a third segment movably attached to the first segment to provide at least one of up and down movement or side to side movement between the third segment and the first segment and a fourth segment coupled to the third segment and configured to cover a second portion of the electrical conductor.

19. The method of claim 18, wherein the second cover portion is movable with respect to the first cover portion.

20. The method of claim 18, comprising coupling a restraining structure between the third segment and the first segment to limit the at least one of up and down movement or side to side movement between the third segment and the first segment.

* * * * *